US012413025B2

(12) United States Patent
Streckewald et al.

(10) Patent No.: US 12,413,025 B2
(45) Date of Patent: Sep. 9, 2025

(54) WAFER ASSEMBLY FOR ELECTRICAL CONNECTOR ASSEMBLIES

(71) Applicant: TE Connectivity Solutions GmbH, Schaffhausen (CH)

(72) Inventors: Michael Streckewald, Harrisburg, PA (US); Justin Dennis Pickel, Hummelstown, PA (US); Julia Anne Lachman, York, PA (US); Chad William Morgan, Carneys Point, NJ (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 508 days.

(21) Appl. No.: 17/866,619

(22) Filed: Jul. 18, 2022

(65) Prior Publication Data

US 2024/0022028 A1 Jan. 18, 2024

(51) Int. Cl.

*H01R 13/514* (2006.01)
*H01R 13/516* (2006.01)
*H01R 13/6582* (2011.01)
*H01R 13/6586* (2011.01)
*H01R 13/6592* (2011.01)

(52) U.S. Cl.

CPC ....... *H01R 13/6592* (2013.01); *H01R 13/514* (2013.01); *H01R 13/516* (2013.01); *H01R 13/6582* (2013.01); *H01R 13/6586* (2013.01)

(58) Field of Classification Search

CPC H01R 13/6592; H01R 13/514; H01R 13/516; H01R 13/6582; H01R 13/6586; H01R 13/518; H01R 13/6585

USPC ............................................ 439/607, 607.41

See application file for complete search history.

(56) References Cited

U.S. PATENT DOCUMENTS

| | | | | |
|---|---|---|---|---|
| 10,403,565 B1 * | 9/2019 | Henry | ................ | H01R 13/6596 |
| 11,081,821 B2 * | 8/2021 | Blackburn | ......... | H01R 13/6582 |
| 2014/0242841 A1 * | 8/2014 | Trout | ................. | H01R 13/6585 |
| | | | | 439/607.55 |
| 2020/0358227 A1 * | 11/2020 | Henry | ................ | H01R 13/6597 |

FOREIGN PATENT DOCUMENTS

WO WO-2021154702 A1 * 8/2021 ........... H01R 12/716

* cited by examiner

*Primary Examiner* — Tulsidas C Patel
*Assistant Examiner* — Thaslimur Rahman

(57) ABSTRACT

A wafer assembly includes a leadframe having signal contacts and cables with signal conductors terminated to the corresponding signal contacts. Each cable includes a cable shield providing shielding for the signal conductors. The wafer assembly includes a wafer body holding the signal contacts. The wafer assembly includes first and second ground frames coupled to the first and second sides of the wafer body to provide electrical shielding for the leadframe. The ground frames include ground shields providing shielding for mating ends of the corresponding signal contacts. The ground frames includes cable covers coupled to the corresponding cable shields.

20 Claims, 6 Drawing Sheets

WAFER ASSEMBLY FOR ELECTRICAL CONNECTOR ASSEMBLIES

BACKGROUND OF THE INVENTION

The subject matter herein relates generally to electrical connectors for a communication system.

Communication systems use electrical connectors to electrically connect various components to allow data communication between the components. For example, electrical connectors may be directly mated together. The electrical connectors typically include a plug connector and a receptacle connector. The connectors may be cable connectors having high speed differential cables terminated to the signal conductors of the connectors. The signal conductors of the two electrical connectors transition between the two connectors. For high-speed connectors, shielding is required, adding to the complexity of the connector designs. However, as data rates increase, conventional shielding is insufficient. For example, at interfaces between the cables and the signal conductors of the connectors signal integrity problems are common.

A need remains for a reliable electrical connector having sufficient electrical shielding for high speed applications.

BRIEF DESCRIPTION OF THE INVENTION

In one embodiment, a wafer assembly for an electrical connector is provided. The wafer assembly includes a leadframe having signal contacts extend between mating ends and terminating ends. The signal contacts have main bodies between the mating ends and the terminating ends. The wafer assembly includes cables rearward of the leadframe. Each cable includes first and second signal conductors arranged as a signal pair terminated to the terminating ends of the corresponding signal contacts. Each cable includes a cable shield providing shielding for the signal pair. The wafer assembly includes a wafer body holding the signal contacts. The wafer body has a front, a rear, a first side between the front and the rear, and a second side between the front and the rear. The cables located rearward of the rear of the wafer body. The wafer body supports the main bodies of the signal contacts. The mating ends extend forward of the front of the wafer body. The terminating ends extend rearward of the rear of the wafer body. The wafer assembly includes a first ground frame coupled to the first side of the wafer body to provide electrical shielding for the leadframe. The first ground frame includes first ground shields providing shielding for the mating ends of the corresponding signal contacts. The first ground frame includes first cable covers coupled to the corresponding cable shields. The wafer assembly includes a second ground frame coupled to the second side of the wafer body to provide electrical shielding for the leadframe. The second ground frame includes second cable covers coupled to the corresponding cable shields.

In another embodiment, a wafer assembly for an electrical connector is provided. The wafer assembly includes a leadframe having signal contacts extend between mating ends and terminating ends. The signal contacts have main bodies between the mating ends and the terminating ends. The wafer assembly includes cables rearward of the leadframe. Each cable includes first and second signal conductors arranged as a signal pair terminated to the terminating ends of the corresponding signal contacts. Each cable includes a cable shield providing shielding for the signal pair. Each cable shield has a first side, a second side, a top end transitioning between the first and second sides, and a bottom end transitioning between the first and second sides. The wafer assembly includes a wafer body holding the signal contacts. The wafer body has a front, a rear, a first side between the front and the rear, and a second side between the front and the rear. The cables located rearward of the rear of the wafer body. The wafer body supports the main bodies of the signal contacts. The mating ends extend forward of the front of the wafer body. The terminating ends extend rearward of the rear of the wafer body. The wafer assembly includes a first ground frame coupled to the first side of the wafer body to provide electrical shielding for the leadframe. The first ground frame includes first ground shields providing shielding for the mating ends of the corresponding signal contacts. The first ground frame includes first cable covers coupled to the corresponding cable shields. Each first cable cover includes a first central spine, a first upper wing, and a first lower wing. The first central spine coupled to the first side of the corresponding cable shield. The first upper wing coupled to the upper end of the corresponding cable shield. The first lower wing coupled to the lower end of the corresponding cable shield. The wafer assembly includes a second ground frame coupled to the second side of the wafer body to provide electrical shielding for the leadframe. The second ground frame includes second cable covers coupled to the corresponding cable shields. Each second cable cover includes a second central spine, a second upper wing, and a second lower wing. The second central spine coupled to the second side of the corresponding cable shield. The second upper wing coupled to the upper end of the corresponding cable shield. The second lower wing coupled to the lower end of the corresponding cable shield.

In a further embodiment, an electrical connector assembly is provided and includes a housing having a mating interface configured to be mated with a mating electrical connector assembly. The housing has a cavity. The electrical connector assembly includes wafer assemblies received in the cavity and coupled to the housing. The wafer assemblies are arranged in a wafer stack. Each wafer assembly includes a leadframe, a wafer body holding the leadframe, cables coupled to the leadframe, a first ground frame coupled to the wafer body to provide electrical shielding for the leadframe, and a second ground frame coupled to the wafer body to provide electrical shielding for the leadframe. The first ground frame is coupled to cable shields of each of the cables and the second ground frame is coupled to the cable shields of each of the cables. The first ground frame is configured to be coupled to the mating electrical connector assembly and the second ground frame is configured to be coupled to the mating electrical connector assembly.

DETAILED DESCRIPTION OF THE INVENTION

Figure 1:
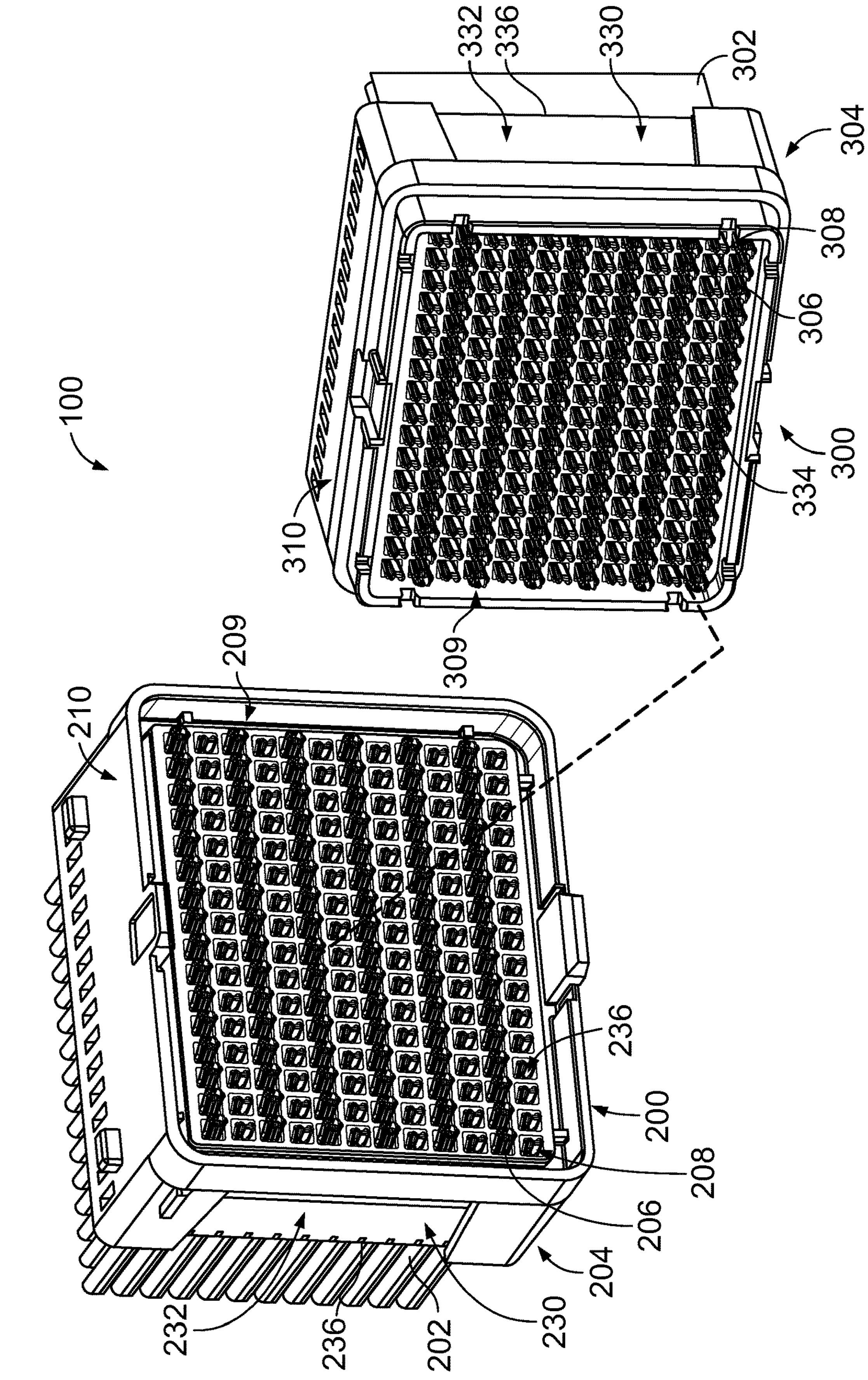
FIG. 1 illustrates a communication system in accordance with an exemplary embodiment.

FIG. 1 illustrates a communication system 100 in accordance with an exemplary embodiment. The communication system 100 includes a first electrical connector assembly 200 and the second electrical connector assembly 300 configured to be electrically coupled together. In various embodiments, the communication system 100 may be a server or network switch. In other various embodiments, the communication system 100 may be a backplane system. In various embodiments, the first and second electrical connector assemblies 200, 300 are cable connector assemblies. However, in alternative embodiments, the first electrical connector assembly 200 and/or the second electrical connector assembly 300 may be a circuit board connector mounted to a circuit board.

In an exemplary embodiment, the first and second electrical connector assemblies 200, 300 are directly mated together. For example, the first electrical connector assembly 200 may be plugged into the second electrical connector assembly 300 and/or the second electrical connector assembly 300 may be plugged into the first electrical connector assembly 200. The first and second electrical connector assemblies 200, 300 are mated at a separable mating interface. The first and second electrical connector assemblies 200, 300 are directly mated together without the use of an adapter or additional electrical connector therebetween.

The first electrical connector assembly 200 includes first cables 202 terminated to a first electrical connector 204. The first electrical connector 204 includes first signal contacts 206 and first shield structures 208 providing electrical shielding for the first signal contacts 206.

The second electrical connector assembly 300 includes second cables 302 terminated to a second electrical connector 304. The second electrical connector 304 includes second signal contacts 306 and second shield structures 308 providing electrical shielding for the second signal contacts 306.

In an exemplary embodiment, the first and second electrical connectors 204, 304 have hermaphroditic mating interfaces defined, at least in part, by the signal contacts 206, 306 and the shield structures 208, 308. As such, the first and second electrical connectors 204, 304 are identical to each other allowing use of the same parts in both the first and second electrical connectors 204, 304. However, in alternative embodiments, the first and second electrical connectors 204, 304 are not hermaphroditic but rather have complementary mating interfaces.

In an exemplary embodiment, the signal contacts 206, 306 are arranged in rows and columns. The first signal contacts 206 are arranged for direct mating with the second signal contacts 306 when the first and second electrical connectors 204, 304 are mated. The shield structures 208, 308 provide electrical shielding around the signal contacts 206, 306 at the mating interfaces between the signal contacts 206, 306. In an exemplary embodiment, the first signal contacts 206 and the first shield structures 208 are pluggable into the second electrical connector 304. The second signal contacts 306 and the second shield structures 308 are pluggable into the first electrical connector 204. The communication system 100 is a direct plug communication system.

The signal contacts 206, 306 define electrical paths between the cables 202, 302. The signal contacts 206, 306 mate at a separable mating interface between the first and second electrical connectors 204, 304. For example, the mating interfaces of the signal contacts 206, 306 are arranged along mating planes (for example, parallel to the columns). In various embodiments, the first signal contacts 206 are arranged in pairs and the second signal contacts 306 are arranged in pairs. The shield structures 208, 308 cooperate to provide shielding for the corresponding signal contacts 206, 306 (for example, pairs of the signal contacts 206, 306). In an exemplary embodiment, the shield structures 208, 308 provide 360° shielding for the corresponding signal contacts 206, 306. The shield structures 208, 308 may be electrically connected to cable shields of the cables 202, 302 to continue shielding along the signal paths between the cables 202, 302. The shield structures 208, 308 may be electrically connected to shielding structures passing through the electrical connectors 204, 304.

The first electrical connector 204 includes a housing 210 having a mating interface configured to be mated with the second electrical connector 304. The mating interface is provided at a front of the housing 210. In an exemplary embodiment, the first electrical connector 204 includes a plurality of wafers assemblies 230 coupled to the housing 210. The wafers assemblies 230 are received in a cavity 209 of the housing 210. The wafer assemblies 230 include the signal contacts 206 and the shield structures 208. The cables 202 are configured to be terminated to corresponding wafer assemblies 230. For example, the wafer assemblies 230 may support the cables 202 and signal conductors of the cables 202 are soldered or otherwise terminated to corresponding signal contacts 206. The cables 202 may extend into the cavity 209. In an exemplary embodiment, the wafer assemblies 230 are oriented vertically. However, other orientations are possible in alternative embodiments. Each wafer assembly 230 includes a corresponding column of the signal contacts 206. The wafer assemblies 230 are stacked in the housing 210 to arrange the signal contacts 206 in rows.

In an exemplary embodiment, the wafer assemblies 230 are arranged in a wafer stack 232. For example, the wafer assemblies 230 are parallel to each other in the wafer stack 232. The wafer stack 232 extends from a rear of the housing 210. Optionally, the wafer assemblies 230 may be individually loaded into the housing 210, such as into the cavity 209 at a rear of the housing 210. Alternatively, the wafer assemblies 230 may be assembled together in the wafer stack 232, and the wafer stack 232 is loaded into the rear of the housing 210.

In an exemplary embodiment, each wafer assembly 230 extends between a mating end 234 and a terminating end 236. The cables 202 are terminated to the wafer assembly 230 at the terminating end 236. The mating end 234 extends into the housing 210 and is configured to be mated with the second electrical connector 304. In various embodiments, the wafer assembly 230 may be a right-angle wafer assembly having the mating end 234 at a right angle relative to the terminating end 236. The shield structures 208 are provided at the mating end 234 and are configured to be mated with the second electrical connector 304.

The second electrical connector 304 includes a housing 310 having a mating interface configured to be mated with the first electrical connector 204. The mating interface is provided at a front of the housing 310. In an exemplary embodiment, the second electrical connector 304 includes a plurality of wafer assemblies 330 coupled to the housing 310. The wafers assemblies 330 are received in a cavity 309 of the housing 210. The wafer assemblies 330 include the signal contacts 306 and the shield structures 308. The cables 302 are terminated to the corresponding wafer assemblies 330. For example, conductors of the cables 302 may be soldered or welded to the signal contacts 306. The cables 302 may extend into the cavity 309. In an exemplary embodiment, the wafer assemblies 330 are vertically. However, other orientations are possible in alternative embodiments. Each wafer assembly 330 includes a corresponding column of the signal contacts 306. The wafer assemblies 330 are stacked in the housing 310 to arrange the signal contacts 306 in rows.

In an exemplary embodiment, the wafer assemblies 330 are arranged in a wafer stack 332. For example, the wafer assemblies 330 are parallel to each other in the wafer stack 332. The wafer stack 332 extends from a rear of the housing 310. Optionally, the wafer assemblies 330 may be individually loaded into the housing 310, such as into the cavity 309 at a rear of the housing 310. Alternatively, the wafer assemblies 330 may be assembled together in the wafer stack 332 and the wafer stack 332 is loaded into the rear of the housing 310.

In an exemplary embodiment, each wafer assembly 330 extends between a mating end 334 and a terminating end 336. The cables 302 are terminated to the wafer assembly 330 at the terminating end 336. The mating end 334 extends into the housing 310 is configured to be mated with the first electrical connector 204. In various embodiments, the wafer assembly 330 may be a right-angle wafer assembly having the mating end 334 at a right angle relative to the terminating end 336. The shield structures 308 are provided at the mating end 334 and are configured to be mated with the first electrical connector 204.

Figure 2:
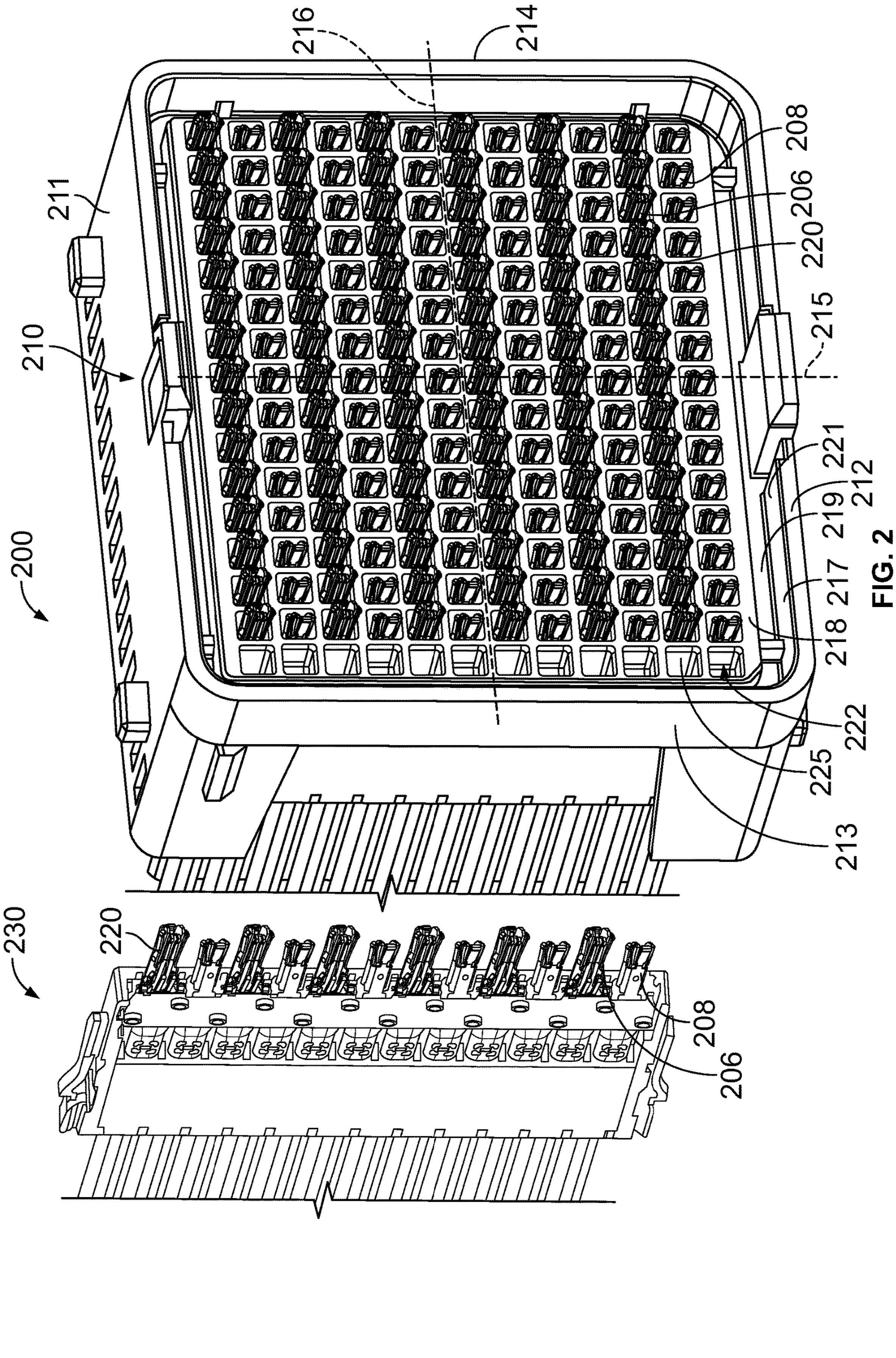
FIG. 2 is a front perspective, partially exploded view of the first electrical connector assembly in accordance with an exemplary embodiment showing the mating interface.

FIG. 2 is a front perspective, partially exploded view of the first electrical connector assembly 200 in accordance with an exemplary embodiment showing the mating interface. The second electrical connector assembly 300 (FIG. 1) may have an identical mating interface. One of the wafer assemblies 230 is shown poised for loading into the housing 210. The housing 210 holds the signal contacts 206 and the shield structures 208 for mating with the second electrical connector 304 (shown in FIG. 1). The housing 210 forms part of the mating interface with the second electrical connector 304.

The housing 210 has a top 211 and a bottom 212. The housing 210 is a first side 213 and a second side 214 opposite the first side 213. The housing 210 has a primary axis 215 extending from top 211 to bottom 212 and a secondary axis 216 extending from the first side 213 to the second side 214. The secondary axis 216 is perpendicular to the primary axis 215. In an exemplary embodiment, the signal contacts 206 and the shield structures 208 are arranged in columns parallel to the primary axis 215 and rows parallel to the secondary axis 216. The mating ends 234 are arranged along mating planes parallel to the primary axis 215 for interfacing with the second contacts 306 (FIG. 1). The wafer assemblies 230 are received in the housing 210 such that the wafer assemblies 230 are oriented parallel to the primary axis 215.

In an exemplary embodiment, the housing 210 is a multi-piece housing including a contact organizer 217 and a commoning member 218. The commoning member 218 is at the front of the housing 210. The contact organizer 217 may include locating features for locating the commoning member 218 relative to the contact organizer 217. In an exemplary embodiment, the commoning member 218 faces the second electrical connector 304. The commoning member 218 is electrically conductive and is used to electrically common each of the shield structures 208. The commoning member 218 provides electrical shielding for the signal contacts 206 at the mating interface. The commoning member 218 may be electrically connected to the shield structures 308 (shown in FIG. 1) of the second electrical connector 304.

In an exemplary embodiment, the contact organizer 217 includes a base 219, an outer shroud 221 surrounding the cavity 209. The base 219 may support towers 220 in the cavity 209. The towers 220 extend forward from the base 219. The towers 220 may be integral with the base 219, such as being co-molded with the base 219. In alternative embodiments, the towers 220 may be separate from the base 219 and loaded into the base 219. For example, the towers 220 may be part of the wafer assemblies 230. The towers 220 support the signal contacts 206 and the shield structures 208. In an exemplary embodiment, the towers 220 extend into openings 222 in the commoning member 218. The towers 220 may pass entirely through the openings 222 and extend forward of the front of the commoning member 218. The towers 220 are configured to be received in corresponding openings in a commoning member of the second electrical connector 304.

The wafer assemblies 230 are coupled to the housing 210 rearward of the base 219. The signal contacts 206 and the shield structures 208 pass through the base 219 to extend along the towers 220. The signal contacts 206 are electrically isolated from each other and from the shield structures 208 by the dielectric material of the towers 220.

The commoning member 218 is manufactured from a conductive material. For example, the commoning member 218 may be a metal block having the openings 222 formed therethrough. In alternative embodiments, the commoning member 218 may be manufactured from a conductive plastic. In other various embodiments, the commoning member 218 may be a plated plastic structure having plating at the front 224 and/or through the openings 222 and/or at the rear. The shield structures 208 are configured to be electrically connected to the commoning member 218. For example, the shield structures 208 may engage the commoning member 218 within the openings 222.

In an exemplary embodiment, the openings 222 pass entirely through the commoning member 218 and are defined by walls 225. In an exemplary embodiment, the openings 222 are rectangular. In the illustrated embodiment, the openings 222 are square shaped. However, the openings 222 may have other shapes. In an exemplary embodiment, the openings 222 are oversized relative to the towers 220. For example, each opening 222 may be sized to receive two of the towers 220 (one from the first electrical connector 204 and one from the second electrical connector 304).

Figure 3:
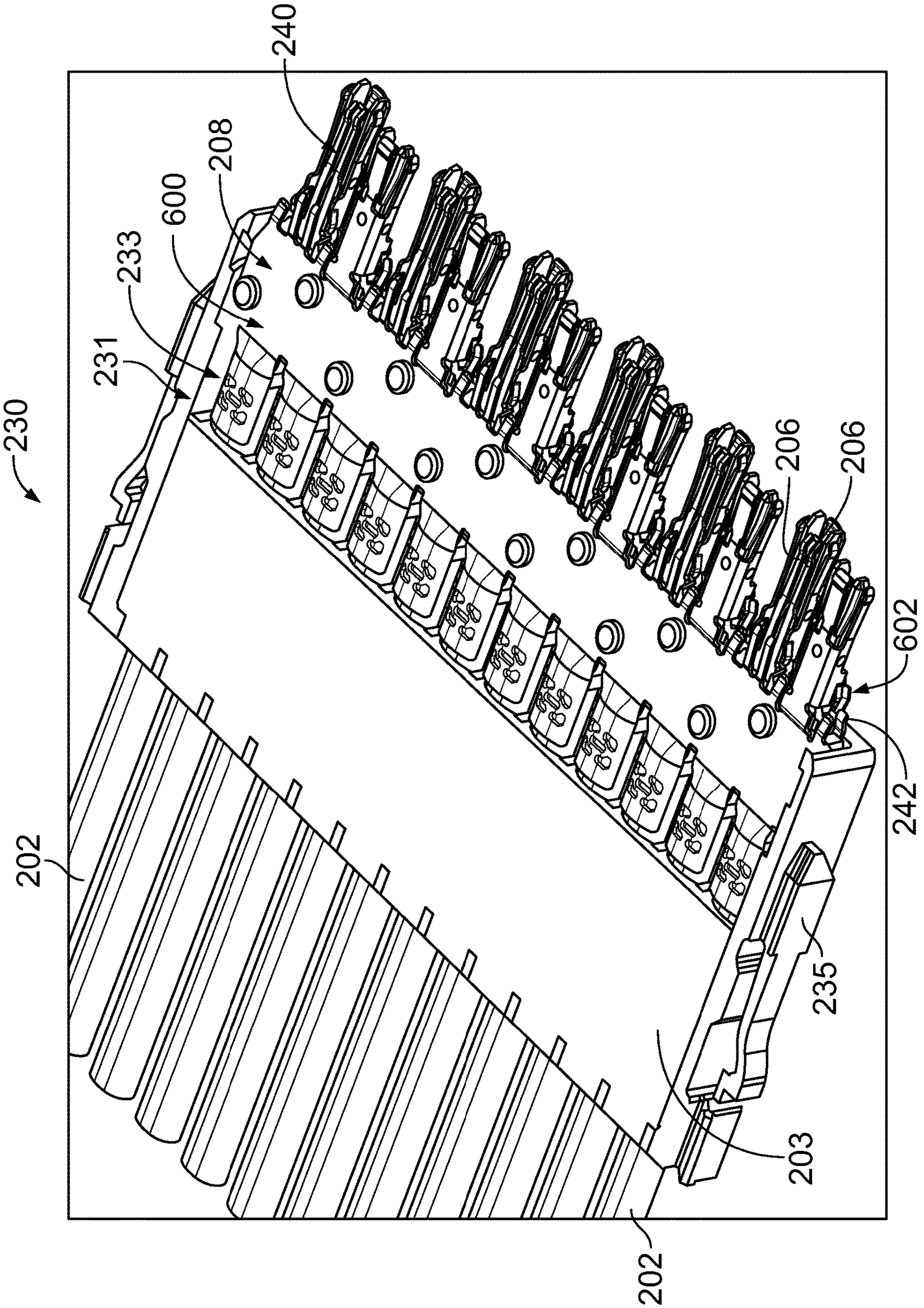
FIG. 3 is a perspective view of the wafer assembly in accordance with an exemplary embodiment.

FIG. 3 is a perspective view of the wafer assembly 230 in accordance with an exemplary embodiment. In an exemplary embodiment, the wafer assembly 230 is identical to the wafer assembly 330 (shown in FIG. 1) with both wafer assemblies 230, 330 including identical components.

The wafer assembly 230 includes the cables 202, the signal contacts 206 and the shield structures 208. The signal contacts 206 and the shield structures 208 are terminated to the cables 202. In an exemplary embodiment, the wafer assembly 230 includes a leadframe 240 including the signal contacts 206. The wafer assembly 230 includes a dielectric wafer body 242 holding the leadframe 240. The wafer assembly 230 includes a first ground frame 600 coupled to a first side of the wafer body 242 and a second ground frame 602 coupled to a second side of the wafer body 242. The first and second ground frames 600, 602 form the shield structures 208. The first and second ground frames 600, 602 provide electrical shielding for the leadframe 240. The first and second ground frames 600, 602 are electrically connected to the cables 202.

In an exemplary embodiment, the wafer assembly 230 includes a wafer frame 231 having a cavity 233. The wafer body 242 and the cables 202 are received in the cavity 233. The wafer frame 231 is used to secure the wafer assembly 230 in the housing 210 (shown in FIG. 2). The wafer frame 231 includes latches 235 to latchably secure the wafer frame 231 in the housing 210.

In an exemplary embodiment, the wafer assembly 230 includes a cable holder 203 holding the cables 202. The cable holder 203 is received in the cavity 233. In various embodiments, the cable holder 203 is an overmolded body that is overmolded over the cables 202. The cable holder 203 may be formed in place on the cables 202. The cable holder 203 may be formed in place in the cavity 233.

Figure 4:
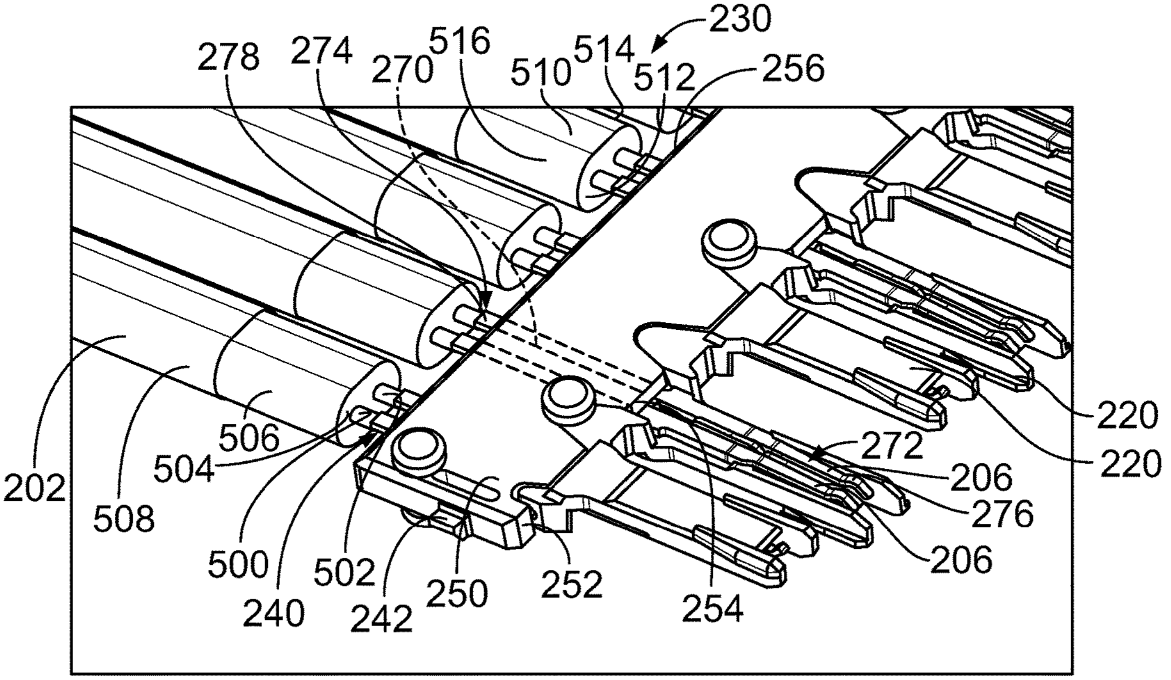
FIG. 4 is a perspective view of a portion of the wafer assembly in accordance with an exemplary embodiment, such as during an initial state of assembly.

FIG. 4 is a perspective view of a portion of the wafer assembly 230 in accordance with an exemplary embodiment, such as during an initial state of assembly. FIG. 4 shows the cables 202, the leadframe 240, the dielectric wafer body 242, and the towers 220. The cables 202 are shown terminated to the signal contacts 206 of the leadframe 240. The wafer body 242 supports the signal contacts 206 of the leadframe 240. The towers 220 extend from the wafer body 242 to support ends of the signal contacts 206.

The cables 202 are shielded cables. In an exemplary embodiment, each cable 202 is a twin-axial cable having a pair of signal conductors, namely a first signal conductor 500 and a second signal conductor 502. The signal conductors 500, 502 are arranged as a signal pair. The signal conductors 500, 502 are held by an insulator 504. A cable shield 506 surrounds the insulator 504. The cable shield 506 provides shielding for the signal pair of signal conductors 500, 502 along the length of the cable 202. A cable jacket 508 surrounds the cable shield 506. The end of the cable 202 is stripped for termination to the signal contacts 206.

In an exemplary embodiment, the cable 202 is oval shaped to surround the signal pair of signal conductors 500, 502. In various embodiments, the cable shield 506 includes a first side 510 and a second side 512 opposite the first side 510. The cable shield 506 includes a first or upper end 514 and a second or lower end 516 opposite the first end 514. Optionally, the sides 510, 512 may be generally flat or planar. The ends 514, 516 are curved between the sides 510, 512. The cable 202 may have other shapes in alternative embodiments, such as having the sides 510, 512 curved, such as at a radius of curvature that is different from the radius of curvature of the ends 514, 516.

The leadframe 240 is a stamped and formed leadframe that forms the signal contacts 206 from a metal sheet. In an exemplary embodiment, the leadframe 240 only includes the signal contacts 206. However, in alternative embodiments, the leadframe 240 may include ground contacts arranged between corresponding signal contacts to provide electrical shielding for the signal contacts. In an exemplary embodiment, the signal contacts 206 are arranged in pairs configured to carry differential signals. However, the signal contacts 206 may be single ended signal contacts in alternative embodiments.

The wafer body 242 surrounds the signal contacts 206 and positions the signal contacts 206 relative to each other. In an exemplary embodiment, the wafer body 242 is manufactured from a dielectric material, such as a plastic material. In an exemplary embodiment, the wafer body 242 is an overmold that is overmolded around the leadframe 240. The wafer body 242 includes first and second sides 250, 252. The wafer body 242 includes a front 254 and a rear 256 extending between a top and a bottom. The front 254 defines a mating end. The signal contacts 206 extend from the wafer body 242 at the front 254 for connection to the second electrical connector 304 (shown in FIG. 1). In an exemplary embodiment, the towers 220 extend from the front 254 of the wafer body 242 to support the ends of the signal contacts 206. In the illustrated embodiment, the towers 220 are separate and discrete from the wafer body 242 and coupled thereto. In alternative embodiments, the towers 220 are integral with the wafer body 242, such as being co-molded with the wafer body 242. The rear 256 defines a cable end. The cables 202 extend from the rear 256 along cable axes.

Each signal contact 206 includes a contact body 270 extending between a mating end 272 and a terminating end 274. The contact body 270 extends along a contact axis. Optionally, the contact axis is parallel to the corresponding cable axis. In an exemplary embodiment, the contact body 270 is stamped and formed as part of the leadframe 240. The contact bodies 270 of the leadframe 240 are generally arranged in a leadframe plane parallel to the sides 250, 252 of the wafer body 242. The signal contact 206 includes a spring beam 276 at the mating end 272. The spring beam 276 is deflectable and configured to be mated with a corresponding spring beam of the second signal contact 306 (shown in FIG. 1). In various embodiments, the spring beam 276 is generally aligned with the main portion of the contact body 270. In an exemplary embodiment, the signal contact 206 includes a solder pad 278 at the terminating end 274 for soldering or welding to the corresponding signal conductor 500, 502 of the cable 202.

Figure 5:
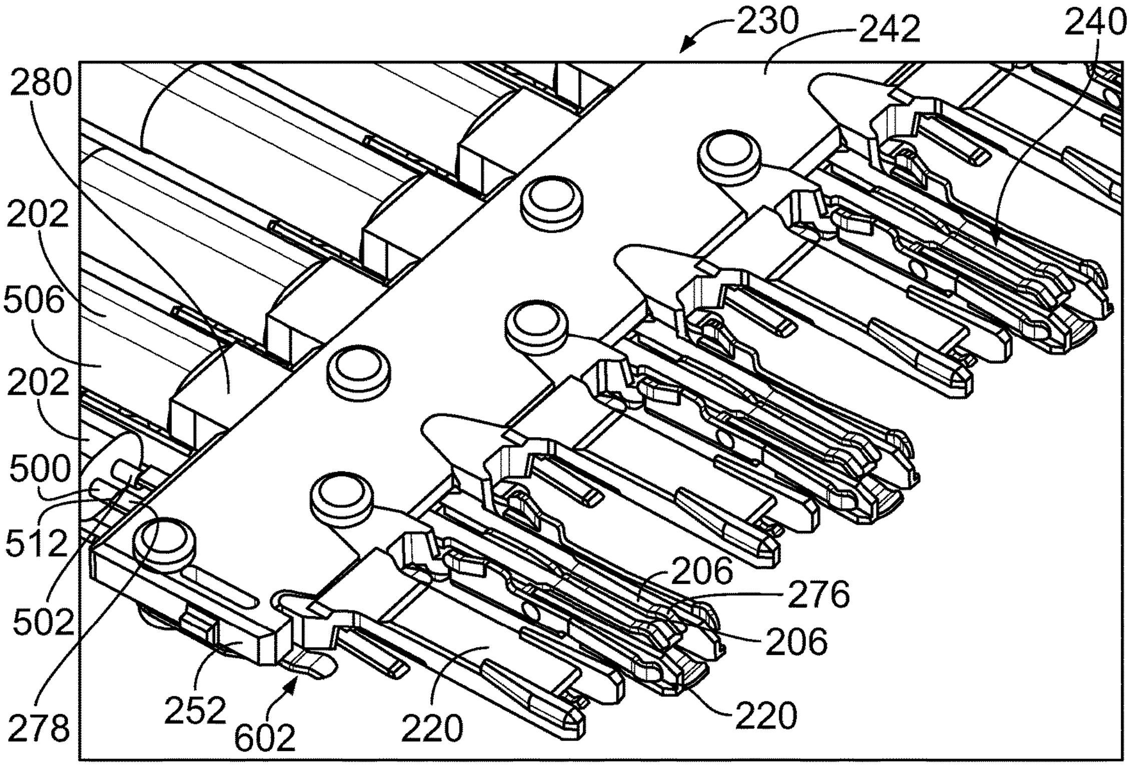
FIG. 5 is a perspective view of a portion of the wafer assembly in accordance with an exemplary embodiment during another stage of assembly.

FIG. 5 is a perspective view of a portion of the wafer assembly 230 in accordance with an exemplary embodiment during another stage of assembly. FIG. 5 shows the cables 202, the leadframe 240, the dielectric wafer body 242, the towers 220, conductor supports 280, and the second ground frame 602. After the conductors 500, 502 of the cables 202 terminated to the solder pads 278 of the signal contacts 206, the conductor supports 280 are added to support the termination. The conductor supports 280 provide strain relief for the conductors 500, 502. In various embodiments, the conductor supports 280 are molded in place over the conductors 500, 502 and the solder pads 278.

In an exemplary embodiment, the second ground frame 602 is coupled to the second side 252 of the wafer body 242. The second ground frame 602 extends along the towers 220 to provide shielding for the spring beams 276 of the signal contacts 206. The second ground frame 602 is configured to be electrically connected to the second side 512 of the cable shield 506 to provide shielding along the signal paths to the cables 202. In an exemplary embodiment, the second ground frame 602 is configured to be electrically connected to the cable shields 506 of each of the cables 202.

Figure 6:
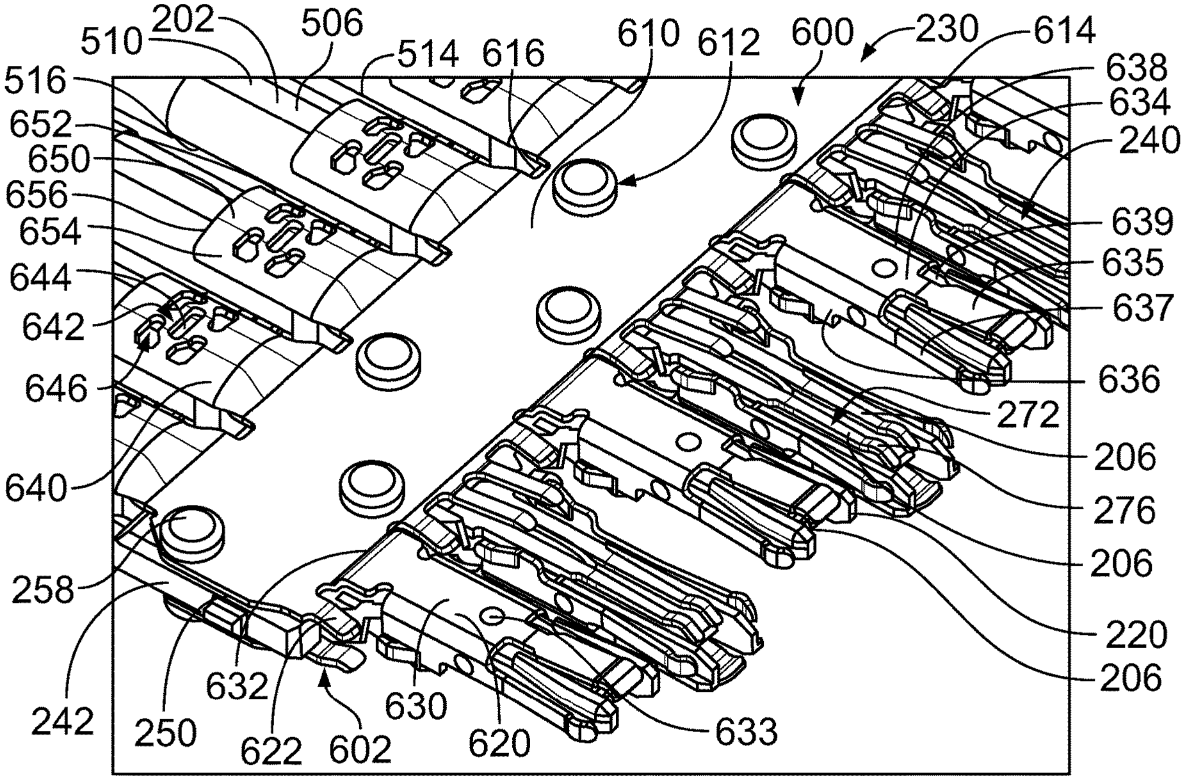
FIG. 6 is a perspective view of a portion of the wafer assembly in accordance with an exemplary embodiment during another stage of assembly.

FIG. 6 is a perspective view of a portion of the wafer assembly 230 in accordance with an exemplary embodiment during another stage of assembly. FIG. 6 shows the first ground frame 600 coupled to the wafer body 242 and the cables 202. The first ground frame 600 is coupled to the first side 250 of the wafer body 242. The first ground frame 600 extends along the towers 220 to provide shielding for the spring beams 276 of the signal contacts 206. The first ground frame 600 is configured to be electrically connected to the first side 510 of the cable shield 506 to provide shielding along the signal paths to the cables 202. In an exemplary embodiment, the first ground frame 600 is configured to be electrically connected to the cable shields 506 of each of the cables 202.

The first ground frame 600 may be similar to the second ground frame 602 and both may include like components identified with like reference numerals. The ground frame 600 provides a shield structure for the signal contacts 206. In an exemplary embodiment, the ground frame 600 includes a ground plate 610, ground shields 620 extending from the ground plate 610 for shielding the mating ends of the signal contacts 206, and cable covers 640 extending from the ground plate 610 for connection to the cable shields 506.

The ground plate 610 forms a main body of the ground frame 600. The ground plate 610 may be planar. The ground plate 610 is coupled to the wafer body 242, such as to the first side 250 of the wafer body 242. The ground plate 610 may include openings 612 that receive bosses 258 extending from the wafer body 242. The bosses 258 may be heat stacked to secure the ground plate 610 to the wafer body 242. The ground plate 610 extends between a front edge 614 and a rear edge 616. The ground shields 620 extend from the front edge 614 of the ground plate 610 and the cable covers 640 extend from the rear edge 616 of the ground plate 610. The ground plate 610 extends between a top and a bottom.

Each ground shield 620 includes a shield portion 630 and a transition portion 632 between the shield portion 630 and the ground plate 610. The shield portion 630 provides electrical shielding along the mating ends 272 of the signal contacts 206. The transition portion 632 may include one or more bends to position the shield portion 630 relative to the ground plate 610. In an exemplary embodiment, the ground frame 600 includes connecting beams 622 extending forward from the front edge 614. The connecting beams 622 are configured to be electrically connected to the commoning member 218 (shown in FIG. 2). The connecting beams 622 may be deflectable spring beams.

In the illustrated embodiment, the shield portion 630 of the ground shield 620 is C-shaped. The shield portion 630 includes an end wall 634 and side walls 636, 638 extending from the end wall 634. The transition portion 632 is connected to the end wall 634. In an exemplary embodiment, the shield portion 630 is stamped such that the end wall 634 includes one or more ground fingers 635 and such that the side walls 636, 638 include one or more ground fingers 637, 639, respectively. The ground fingers 635, 637, 639 include mating interfaces. For example, the ground fingers 635, 637, 639 may be cupped or include bumps near distal ends of the ground fingers 635, 637, 639. The ground fingers 635, 637, 639 are deflectable. Optionally, the end wall 634 and/or the side walls 636, 638 may include dimples 633. The ground fingers 635, 637, 639 extend along the mating ends 272 of the signal contacts 206.

When assembled, as shown in FIG. 6, the ground plate(s) 610 extend along the wafer body 242. The ground shields 620 extend forward of the wafer body 242 to extend along the mating ends 272 of the signal contacts 206. The shield portions 630 of the ground shields 620 provide shielding for the corresponding pair of signal contacts 206. The ground shields 620 are C-shaped and surround three sides of the pair of signal contacts 206. The ground fingers 635 have generally uniform spacing from the spring beams 276 of the pair. The ground fingers 637, 639 of the side walls 636, 638 are spaced generally uniformly from the respective (closest) signal contact 206. The ground shields 620 provide efficient electrical shielding for both signal contacts 206 of the corresponding pair.

Each cable cover 640 extends rearward from the ground plate 610 to couple to the cable shield 506 of the corresponding cable 202. The cable cover 640 may be soldered to the cable shield 506 to create a direct electrical connection. In an exemplary embodiment, the cable cover 640 includes a solder pad 642 configured to be soldered to the cable shield 506. The solder pad 642 includes a solder pocket 644 that receives solder to couple the cable cover 640 to the cable shield 506. The solder pocket 644 may be an opening through the cable cover 640. In an exemplary embodiment, the cable cover 640 includes one or more thermal relief openings 646 adjacent the solder pocket 644. The thermal relief openings 646 limit the heating needed for soldering the solder pad 642 to the cable shield 506. The thermal relief openings 646 allow the heat to be focused at the solder pocket 644 and the solder during the soldering process reducing the soldering time and energy needed to perform the soldering process. Optionally, the cable cover 640 may be soldered at multiple points along the cable shield 506.

In an exemplary embodiment, the cable cover 640 includes a central spine 650, a first upper wing 652 at an upper side of the central spine 650, and a lower wing 654 at a lower side of the central spine 650. The central spine 650 extends to a distal end 656 at a rear of the cable cover 640. The central spine 650 defines the solder pad 642. The central spine 650 extends along the first side 510 of the cable shield 506. The central spine 650 is coupled to the first side 510 of the corresponding cable shield 506. For example, the central spine 650 is soldered to the first side 510 for a direct electrical connection. Portions of the central spine 650 may be capacitively coupled to the first side 510, such as due to close proximity of the central spine 650 to the first side 510. The upper wing 652 is coupled to the upper end 514 of the corresponding cable shield 506. For example, the upper wing 652 may be capacitively coupled to the upper end 514, such as due to close proximity of the upper wing 652 to the upper end 514. In an exemplary embodiment, the upper wing 652 has a curved profile to follow a curvature of the cable shield 506 to stay in close proximity to the cable shield 506. The lower wing 654 is coupled to the lower end 516 of the corresponding cable shield 506. For example, the lower wing 654 may be capacitively coupled to the lower end 516, such as due to close proximity of the lower wing 654 to the lower end 516. In an exemplary embodiment, the lower wing 654 has a curved profile to follow a curvature of the cable shield 506 to stay in close proximity to the cable shield 506.

Figure 7:
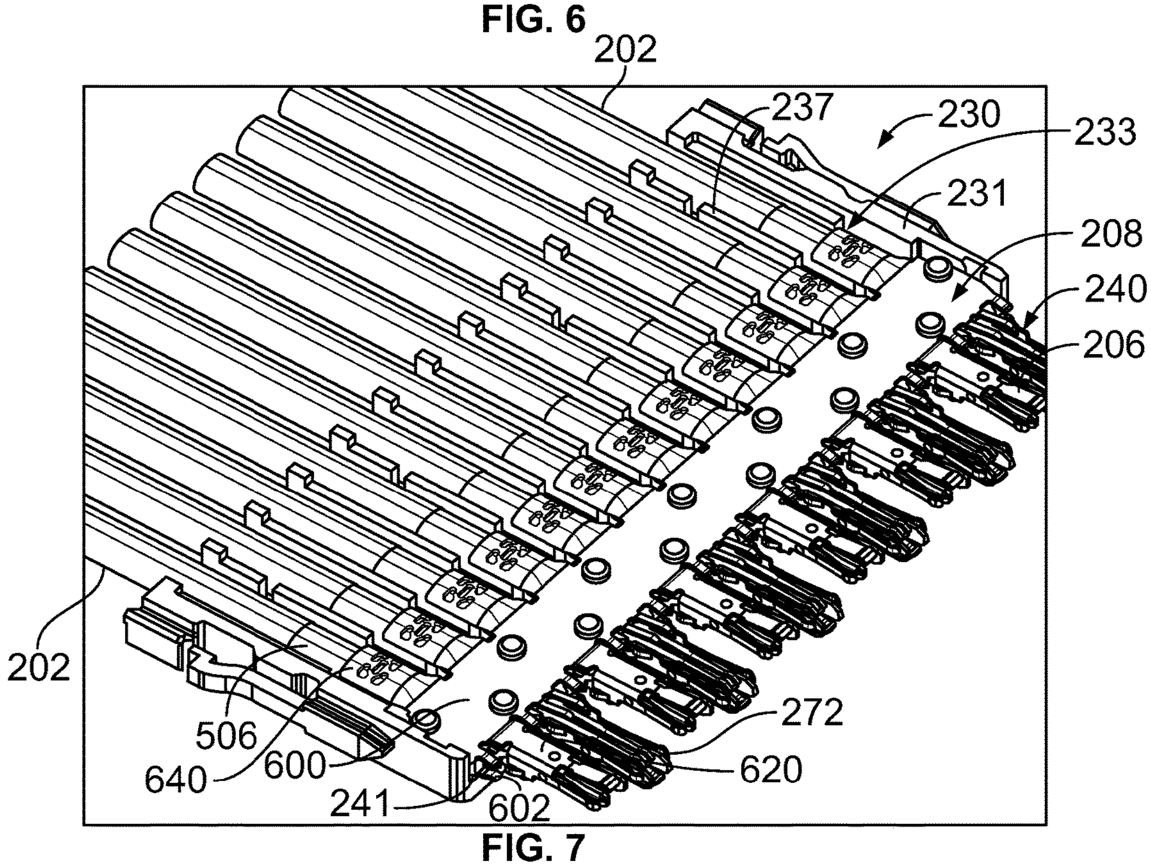
FIG. 7 is a perspective view of the wafer assembly in accordance with an exemplary embodiment during another stage of assembly.

FIG. 7 is a perspective view of the wafer assembly 230 in accordance with an exemplary embodiment during another stage of assembly. FIG. 7 shows the cables, the ground frames 600, 602, the wafer body 242, and the leadframe 240 in the cavity 233 of the wafer frame 231.

In an exemplary embodiment, the wafer frame 231 includes separating walls 237 between the cables 202. The cavity 233 of the wafer frame 231 is configured to receive the cable holder 203 (shown in FIG. 3). The wafer frame 231 and the cable holder 203 are used to hold the cables 202 relative to each other and may provide strain relief for the cables 202. The ground frames 600, 602 are both electrically connected to the cables 202, such as to opposite sides of the cables 202, to provide multiple ground paths between the shield structure 208 and the cable shields 506 of the cables 202. The ground frames 600, 602 extend along the leadframe 240 to provide shielding for the signal contacts 206. The ground shields 620 of the ground frames 600, 602 provide shielding along the mating ends 272 of the signal contacts 206. The ground shields 620 are configured for mating with the second electrical connector assembly 300 (shown in FIG. 1).

Figure 8:
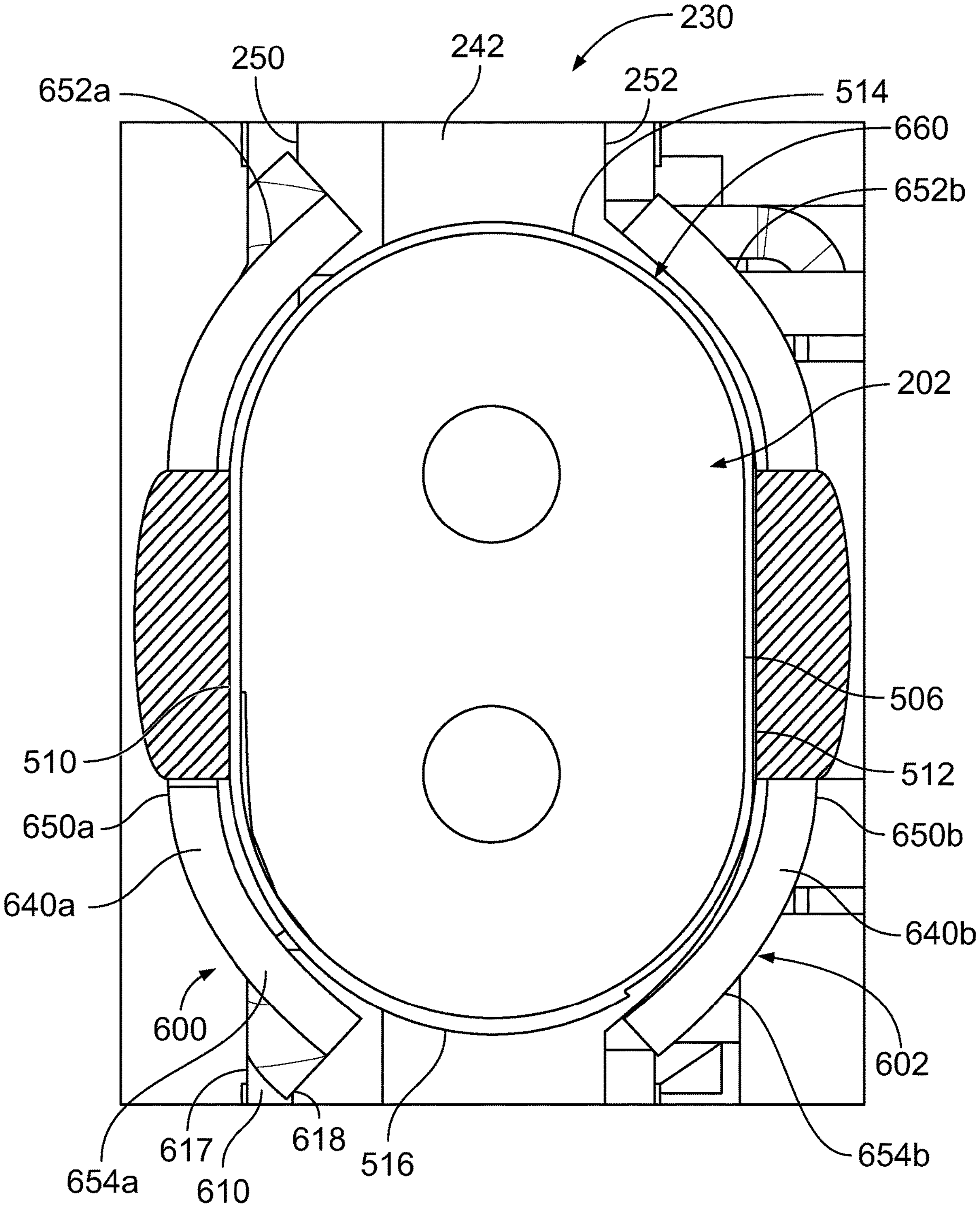
FIG. 8 is a cross-sectional view of a portion of the wafer assembly in accordance with an exemplary embodiment showing the ground frames coupled to the cable.

FIG. 8 is a cross-sectional view of a portion of the wafer assembly 230 in accordance with an exemplary embodiment showing the ground frames 600, 602 coupled to the cable 202. The first ground frame 600 is coupled to the first side 250 of the wafer body 242 and the second ground frame 602 is coupled to the second side 252 of the wafer body 242. The first cable cover 640*a* extends along the first side 510 of the cable shield 506 and the second cable cover 640*b* extends along the second side 512 of the cable shield 506.

The first and second cable covers 640*a*, 640*b* cooperate to form a cable shield pocket 660. The cable 202 is located in the cable shield pocket 660. In an exemplary embodiment, the first and second cable covers 640*a*, 640*b* surround a majority of the cable shield 506 to provide circumferential shielding and connection at the interface between the ground frames 600, 602 and the cable 202. For example, the first and second cable covers 640*a*, 640*b* may surround (for example, cover or extend along) at least 50% of the cable shield 506. In various embodiments, the first and second cable covers 640*a*, 640*b* may surround (for example, cover or extend along) at least 75% of the cable shield 506. The gap or spacing between the ends of the first and second cable covers 640*a*, 640*b* is relatively small (for example, narrow width) when compared to the distance from one neighboring signal pair to the next. Having the cable covers 640*a*, 640*b* close together relative to the distance to the next signal pair reduces cross-talk, even without having the material of the cable covers 640*a*, 640*b* across the gap or space. In an exemplary embodiment, the cable covers 640*a*, 640*b* may have multiple points of electrical connection with the cable 202. The cable covers 640*a*, 640*b* may be capacitively coupled to the cable 202 in areas that are not directly electrically connected to the cable 202.

In an exemplary embodiment, the central spine 650*a* of the first ground frame 600 is coupled to the first side 510 of the corresponding cable shield 506, such as being soldered to the first side 510 for a direct electrical connection. Portions of the central spine 650*a* may be capacitively coupled to the first side 510, such as due to close proximity of the central spine 650*a* to the first side 510. The upper wing 652*a* of the first ground frame 600 is coupled to the upper end 514 of the corresponding cable shield 506, such as being capacitively coupled to the upper end 514 due to the close proximity of the upper wing 652*a* to the upper end 514. The curved profile of the upper wing 652*a* closely follows the curvature of the cable shield 506 to stay in close proximity to the cable shield 506. The lower wing 654*a* of the first ground frame 600 is coupled to the lower end 516 of the corresponding cable shield 506, such as being capacitively coupled to the lower end 516 due to the close proximity of the lower wing 654*a* to the lower end 516. The curved profile of the lower wing 654*a* closely follows the curvature of the cable shield 506 to stay in close proximity to the cable shield 506. In an exemplary embodiment, the central spine 650*a* is located outside of an outer surface 617 of the ground plate 610. The upper and lower wings 652*a*, 654*a* are curved relative to the central spine 650*a*. For example, the upper and lower wings 652*a*, 654*a* are curved to extend inside of an inner surface 618 of the ground plate 610.

In an exemplary embodiment, the central spine 650*b* of the second ground frame 602 is coupled to the second side 512 of the corresponding cable shield 506, such as being soldered to the second side 512 for a direct electrical connection. Portions of the central spine 650*b* may be capacitively coupled to the second side 512, such as due to close proximity of the central spine 650*b* to the second side 512. The upper wing 652*b* of the second ground frame 602 is coupled to the upper end 514 of the corresponding cable shield 506, such as being capacitively coupled to the upper end 514 due to the close proximity of the upper wing 652*b* to the upper end 514. The curved profile of the upper wing 652*b* closely follows the curvature of the cable shield 506 to stay in close proximity to the cable shield 506. The lower wing 654*b* of the second ground frame 602 is coupled to the lower end 516 of the corresponding cable shield 506, such as being capacitively coupled to the lower end 516 due to the close proximity of the lower wing 654*b* to the lower end 516. The curved profile of the lower wing 654*b* closely follows the curvature of the cable shield 506 to stay in close proximity to the cable shield 506.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A wafer assembly for an electrical connector, the wafer assembly comprising:

a leadframe having signal contacts extending between mating ends and terminating ends, the signal contacts having main bodies between the mating ends and the terminating ends;

cables rearward of the leadframe, each cable including first and second signal conductors arranged as a signal pair, the first and second signal conductors being terminated to the terminating ends of the corresponding signal contacts at termination regions, each cable includes a cable shield providing shielding for the signal pair;

a wafer body holding the signal contacts, the wafer body having a front, a rear, a first side between the front and the rear, and a second side between the front and the rear, the cables and termination regions located rearward of the rear of the wafer body, wherein the wafer body supports the main bodies of the signal contacts, the mating ends extending forward of the front of the wafer body, the terminating ends extending rearward of the rear of the wafer body into the termination regions;

a first ground frame coupled to the first side of the wafer body to provide electrical shielding for the leadframe, the first ground frame including first ground shields providing shielding for the mating ends of the corresponding signal contacts, the first ground frame including first cable covers covering the termination regions, the first cable covers coupled to the corresponding cable shields; and a second ground frame coupled to the second side of the wafer body to provide electrical shielding for the leadframe, the second ground frame including second cable covers covering the termination regions, the second cable covers coupled to the corresponding cable shields.

2. The wafer assembly of claim 1, wherein the first cable covers are coupled to the cable shields of all of the cables to electrically connect each of the cable shields, and wherein the second cable covers are coupled to the cable shields of all of the cables to electrically connect each of the cable shields.

3. The wafer assembly of claim 1, wherein the first cable cover has a curved profile following a curvature of the corresponding cable shield, and wherein the second cable cover has a curved profile following a curvature of the corresponding cable shield.

4. The wafer assembly of claim 1, wherein each first cable cover includes a solder pad soldered to the corresponding cable shield, portions of the first cable cover surrounding the solder pad being positioned in close proximity to the corresponding cable shield and being capacitively coupled to the corresponding cable shield, and wherein each second cable cover includes a solder pad soldered to the corresponding cable shield, portions of the second cable cover surrounding the solder pad being positioned in close proximity to the corresponding cable shield and being capacitively coupled to the corresponding cable shield.

5. The wafer assembly of claim 1, wherein each first cable cover includes a first central spine, a first upper wing, and a first lower wing, the first central spine being coupled to a first side of the corresponding cable shield, the first upper wing being coupled to an upper end of the corresponding cable shield, the first lower wing being coupled to a lower end of the corresponding cable shield, and wherein each second cable cover includes a second central spine, a second upper wing, and a second lower wing, the second central spine being coupled to a second side of the corresponding cable shield, the second upper wing being coupled to an upper end of the corresponding cable shield, the second lower wing being coupled to a lower end of the corresponding cable shield.

6. The wafer assembly of claim 5, wherein the first upper wing is capacitively coupled to the upper end of the corresponding cable shield and the first lower wing is capacitively coupled to the lower end of the corresponding cable shield, and wherein the second upper wing is capacitively coupled to the upper end of the corresponding cable shield and the second lower wing is capacitively coupled to the lower end of the corresponding cable shield.

7. The wafer assembly of claim 5, wherein the first central spine is planar, the first upper wing being curved to follow a curvature of the corresponding cable shield, the first lower wing being curved to follow a curvature of the corresponding cable shield, and wherein the second central spine is planar, the second upper wing being curved to follow a curvature of the corresponding cable shield, the second lower wing being curved to follow a curvature of the corresponding cable shield.

8. The wafer assembly of claim 5, wherein the first ground frame includes a first ground plate, the first ground shields extending forward of the first ground plate, the first cable covers extending rearward of the first ground frame, and wherein the second ground frame includes a second ground plate, the second ground shields extending forward of the second ground plate, the second cable covers extending rearward of the second ground frame.

9. The wafer assembly of claim 8, wherein the first ground plate includes an inner surface facing the wafer body and an outer surface opposite the inner surface, the first cable cover located outside of the outer surface, the first upper wing and the first lower wing being located inside of the inner surface, and wherein the second ground plate includes an inner surface facing the wafer body and an outer surface opposite the inner surface, the second cable cover located outside of the outer surface, the second upper wing and the second lower wing being located inside of the inner surface.

10. The wafer assembly of claim 1, wherein each first cable cover includes a solder pocket receiving solder to couple the first cable cover to the cable shield, the first cable cover including a thermal relief opening adjacent the solder pocket, and wherein each second cable cover includes a solder pocket receiving solder to couple the second cable cover to the cable shield, the second cable cover including a thermal relief opening adjacent the solder pocket.

11. The wafer assembly of claim 1, wherein the first and second cable covers cooperate to form a cable shield pocket surrounding a majority of the corresponding cable shield.

12. The wafer assembly of claim 11, wherein the first and second cable covers surround greater than 75% of the corresponding cable shield.

13. The wafer assembly of claim 1, wherein the second ground frame includes second cable covers providing shielding for the mating ends of the corresponding signal contacts.

14. A wafer assembly for an electrical connector, the wafer assembly comprising:

a leadframe having signal contacts extending between mating ends and terminating ends, the signal contacts having main bodies between the mating ends and the terminating ends;

cables rearward of the leadframe, each cable including first and second signal conductors arranged as a signal pair, the first and second signal conductors terminated to the terminating ends of the corresponding signal contacts, each cable includes a cable shield providing shielding for the signal pair, each cable shield having a first side, a second side, a top end transitioning between the first and second sides, and a bottom end transitioning between the first and second sides;

a wafer body holding the signal contacts, the wafer body having a front, a rear, a first side between the front and the rear, and a second side between the front and the rear, the cables located rearward of the rear of the wafer body, wherein the wafer body supports the main bodies of the signal contacts, the mating ends extending forward of the front of the wafer body, the terminating ends extending rearward of the rear of the wafer body;

a first ground frame coupled to the first side of the wafer body to provide electrical shielding for the leadframe, the first ground frame includes a first ground plate along the first side of the wafer body, the first ground frame including first ground shields extending forward of the first ground plate and providing shielding for the mating ends of the corresponding signal contacts, the first ground frame including first cable covers extending rearward of the first ground plate and coupled to the corresponding cable shields, each first cable cover including a first central spine, a first upper wing, and a first lower wing, the first central spine coupled to the first side of the corresponding cable shield, the first upper wing coupled to the upper end of the corresponding cable shield, the first lower wing coupled to the lower end of the corresponding cable shield; and a second ground frame coupled to the second side of the wafer body to provide electrical shielding for the leadframe, the second ground frame includes a second ground plate along the second side of the wafer body, the second ground frame including second cable covers extending rearward of the second ground plate and coupled to the corresponding cable shields, each second cable cover including a second central spine, a second upper wing, and a second lower wing, the second central spine coupled to the second side of the corresponding cable shield, the second upper wing coupled to the upper end of the corresponding cable shield, the second lower wing coupled to the lower end of the corresponding cable shield.

15. The wafer assembly of claim 14, wherein the first cable covers are coupled to the cable shields of all of the cables to electrically connect each of the cable shields, and wherein the second cable covers are coupled to the cable shields of all of the cables to electrically connect each of the cable shields.

16. The wafer assembly of claim 14, wherein each first cable cover has a curved profile following a curvature of the corresponding cable shield, and wherein each second cable cover has a curved profile following a curvature of the corresponding cable shield.

17. The wafer assembly of claim 14, wherein each first central spine includes a solder pad soldered to the corresponding cable shield, each first upper wing and the first lower wing positioned in close proximity to the corresponding cable shield and being capacitively coupled to the corresponding cable shield, and wherein each second central spine includes a solder pad soldered to the corresponding cable shield, each second upper wing and the second lower wing positioned in close proximity to the corresponding cable shield and being capacitively coupled to the corresponding cable shield.

18. The wafer assembly of claim 14, wherein the first upper wing is capacitively coupled to the upper end of the corresponding cable shield and the first lower wing is capacitively coupled to the lower end of the corresponding cable shield, and wherein the second upper wing is capacitively coupled to the upper end of the corresponding cable shield and the second lower wing is capacitively coupled to the lower end of the corresponding cable shield.

19. The wafer assembly of claim 14, wherein the first central spine is planar, the first upper wing being curved to follow a curvature of the corresponding cable shield, the first lower wing being curved to follow a curvature of the corresponding cable shield, and wherein the second central spine is planar, the second upper wing being curved to follow a curvature of the corresponding cable shield, the second lower wing being curved to follow a curvature of the corresponding cable shield.

20. An electrical connector assembly comprising:

a housing having a mating interface configured to be mated with a mating electrical connector assembly, the housing having a cavity; and wafer assemblies received in the cavity and coupled to the housing, the wafer assemblies arranged in a wafer stack, each wafer assembly including a leadframe, a wafer body holding the leadframe, cables coupled to the leadframe at termination regions, a first ground frame coupled to the wafer body to provide electrical shielding for the leadframe, and a second ground frame coupled to the wafer body to provide electrical shielding for the leadframe, wherein the first ground frame covers the termination regions and is coupled to cable shields of each of the cables and the second ground frame covers the termination regions and is coupled to the cable shields of each of the cables, and wherein the first ground frame is configured to be coupled to the mating electrical connector assembly and the second ground frame is configured to be coupled to the mating electrical connector assembly.

* * * * *